(12) United States Patent
Raphaeli et al.

(10) Patent No.: US 10,830,869 B2
(45) Date of Patent: Nov. 10, 2020

(54) VEHICLE RADAR SYSTEM AND METHOD OF CALIBRATING THE SAME

(71) Applicants: GM GLOBAL TECHNOLOGY OPERATIONS LLC, Detroit, MI (US); Silantrix Ltd., Kfar Saba (IL)

(72) Inventors: Dani Raphaeli, Kfar Saba (IL); Oded Bialer, Herzliya (IL); Igal Bilik, Herzliya (IL)

(73) Assignees: GM GLOBAL TECHNOLOGY OPERATIONS LLC, Detroit, MI (US); SILANTRIX LTD., Kfar Saba (IL)

( * ) Notice: Subject to any disclaimer, the term of this patent is extended or adjusted under 35 U.S.C. 154(b) by 318 days.

(21) Appl. No.: 15/979,732

(22) Filed: May 15, 2018

(65) Prior Publication Data
US 2019/0353751 A1 Nov. 21, 2019

(51) Int. Cl.
*G01S 7/40* (2006.01)
*G01S 13/58* (2006.01)
*G01S 7/292* (2006.01)
*G01S 13/931* (2020.01)

(52) U.S. Cl.
CPC ........... *G01S 7/40* (2013.01); *G01S 7/292* (2013.01); *G01S 13/582* (2013.01); *G01S 13/931* (2013.01)

(58) Field of Classification Search
CPC .................................. G01S 7/40; G01S 7/292
USPC ........................................................ 342/174
See application file for complete search history.

(56) References Cited

U.S. PATENT DOCUMENTS

| | | | | |
|---|---|---|---|---|
| 5,883,593 A * | 3/1999 | Chamouard | .......... | G01S 7/4004 342/174 |
| 6,407,696 B1 * | 6/2002 | Neben | ................... | G01S 7/4021 342/70 |
| 6,462,704 B2 * | 10/2002 | Rexberg | ................. | H01Q 3/267 342/174 |
| 6,975,265 B2 * | 12/2005 | Schlick | ................. | G01S 7/4004 342/165 |
| 7,548,189 B2 * | 6/2009 | Alon | ..................... | G01S 7/4026 342/149 |
| 7,961,134 B2 * | 6/2011 | Ranney | .............. | G06K 9/00711 342/25 R |

(Continued)

*Primary Examiner* — Marcus E Windrich
(74) *Attorney, Agent, or Firm* — Reising Ethington, P.C.

(57) ABSTRACT

A vehicle radar system and calibration method that provide for system calibration so that target object parameters can be calculated with improved accuracy. Generally speaking, the calibration method uses a number of hypothesized calibration matrices, which represent educated guesses for possible system or array calibrations, to obtain a number of beamforming images. A blurring metric is then derived for each beamforming image, where the blurring metric is generally representative of the quality or resolution of the beamforming image. The method then selects hypothesized calibration matrices based on their blurring metrics, where the selected matrices are associated with the blurring metrics having the best beamforming image resolution (e.g., the least amount of image blurriness). The selected hypothesized calibration matrices are then used to generate new calibration matrices, which in turn can be used to calibrate the vehicle radar system so that more accurate target object parameters can be obtained.

18 Claims, 3 Drawing Sheets

(56) References Cited

U.S. PATENT DOCUMENTS

| | | | |
|---|---|---|---|
| 8,786,487 B2* | 7/2014 | Kemkemian | H01Q 1/28 |
| | | | 342/29 |
| 2019/0086512 A1* | 3/2019 | Bilik | G01S 7/4026 |
| 2019/0129003 A1* | 5/2019 | Longman | G01S 13/32 |

* cited by examiner

VEHICLE RADAR SYSTEM AND METHOD OF CALIBRATING THE SAME

TECHNICAL FIELD

The present invention relates generally to radar systems, and more particularly, to vehicle radar systems and methods of calibrating the same.

BACKGROUND

Many modern vehicles are equipped with advanced safety and driver-assist systems that require robust and precise object detection and tracking systems to control host vehicle maneuvers. These systems utilize periodic or continuous detection of objects and control algorithms to estimate various object parameters, such as the relative object range, velocity, direction of travel, and size. For example, radar devices detect and locate objects (i.e., targets), by transmitting electromagnetic signals that reflect off targets within a sensor's field-of-view. The reflected signal returns to the radar as echoes where they are processed to determine various information such as the round-trip travel time of the transmitted/received signals.

Advanced radar systems in use today may utilize a multiple-input multiple-output (MIMO) concept that employs multiple antennas at the transmitter to transmit independent waveforms and multiple antennas at the receiver to receive the radar echoes. In a "co-located" MIMO radar configuration, the antennas in both the transmitter and the receiver are spaced sufficiently close so that each antenna views the same aspect of an object such that a point target is assumed. In the MIMO receiver, a matched filter bank is used to extract the waveform components. When the signals are transmitted from different antennas, the echoes of each signal carry independent information about detected objects and the different propagation paths. Phase differences caused by different transmitting antennas along with phase differences caused by different receiving antennas mathematically form a virtual antenna array that provides for a larger virtual aperture using fewer antenna elements. Conceptually, the virtual array is created by interleaving between each of the transmitter Tx and receiver Rx antenna elements such that the elements in the virtual array represent Tx-Rx pairs for each of the transmitter Tx and receiver Rx antennas in the MIMO array. For co-located MIMO antennas, a transmit array having N transmitter antennas and a receive array having M receive antennas produces a virtual array having M×N virtual receiver elements. In other words, the waveforms are extracted by the matched filters at the receiver such that there are a total of M×N extracted signals in the virtual array. The M×N virtual receiver elements can be used to create a beamforming image.

However, over time, certain aspects of the radar configuration, such as predetermined values used in the creation of the beamforming image, may need to be adjusted or calibrated in order to maintain the desired level of accuracy in a particular radar configuration.

SUMMARY

According to one aspect, there is provided a method of calibrating a vehicle radar system that comprises a transmit antenna array having a plurality of transmitting antennas and a receive antenna array having a plurality of receiving antennas. The method may comprise the steps of: transmitting a plurality of transmit signals with the transmit antenna array; receiving a plurality of receive signals with the receive antenna array; obtaining a plurality of antenna responses based on the plurality of receive signals, each of the antenna responses includes position information relating to a target object; applying a plurality of hypothesized calibration matrices to each of the plurality of receive antenna responses to obtain a plurality of calibrated array responses, each of the plurality of hypothesized calibration matrices includes calibration information relating to the vehicle radar system; applying a first beamformer matrix and a second beamformer matrix to each of the plurality of calibrated array responses to obtain a plurality of beamforming images; deriving at least one blurring metric for each of the plurality of beamforming images, each of the plurality of blurring metrics is representative of a beamforming image resolution; selecting at least one of the plurality of hypothesized calibration matrices based on the plurality of blurring metrics, the selected hypothesized calibration matrix is associated with the blurring metric having the best beamforming image resolution; and using the selected hypothesized calibration matrix to calibrate the vehicle radar system.

According to another aspect, there is provided a vehicle radar system that is mounted on a host vehicle. The vehicle radar system may comprise: a transmitter; a transmit antenna array with a plurality of transmitting antennas coupled to the transmitter, the transmit antenna array transmits a plurality of transmit signals; a receive antenna array with a plurality of receiving antennas, the receive antenna array receives a plurality of receive signals; and a receiver coupled to the receive antenna array, wherein the receiver may be configured to: obtain a plurality of antenna responses based on the plurality of receive signals, each of the antenna responses includes position information relating to a target object; apply a plurality of hypothesized calibration matrices to each of the plurality of receive antenna responses to obtain a plurality of calibrated array responses, each of the plurality of hypothesized calibration matrices includes calibration information relating to the vehicle radar system; apply at least one beamformer matrix to each of the plurality of calibrated array responses to obtain a plurality of beamforming images; derive at least one blurring metric for each of the plurality of beamforming images, each of the plurality of blurring metrics is representative of a beamforming image resolution; select at least one of the plurality of hypothesized calibration matrices based on the plurality of blurring metrics, the selected hypothesized calibration matrix is associated with the blurring metric having the best beamforming image resolution; and use the selected hypothesized calibration matrix to calibrate the vehicle radar system.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The vehicle radar system and calibration method described herein provide for system calibration so that target object parameters can be calculated with improved accuracy. Generally speaking, the calibration method uses a number of hypothesized calibration matrices, which represent educated guesses for possible system or array calibrations, to obtain a number of beamforming images. A blurring metric is then derived for each beamforming image, where the blurring metric is generally representative of the quality or resolution of the beamforming image. The method then selects hypothesized calibration matrices based on their blurring metrics, where the selected matrices are associated with the blurring metrics having the best beamforming image resolution (e.g., the least amount of image blurriness). The selected hypothesized calibration matrices are then used to generate new calibration matrices, which in turn can be used to calibrate the vehicle radar system so that more accurate target object parameters can be obtained. This type of calibration can, for example, be used to help overcome image corruption due to convolution with a beam shape that results in blurriness and sidelobes. According to one example, the method provides new calibration matrices including a first calibration matrix for an elevational dimension and a second calibration matrix for an azimuthal dimension (so-called 2D calibration), and the method can provide such calibration on the fly (i.e., while the vehicle is being driven).

Figure 1:
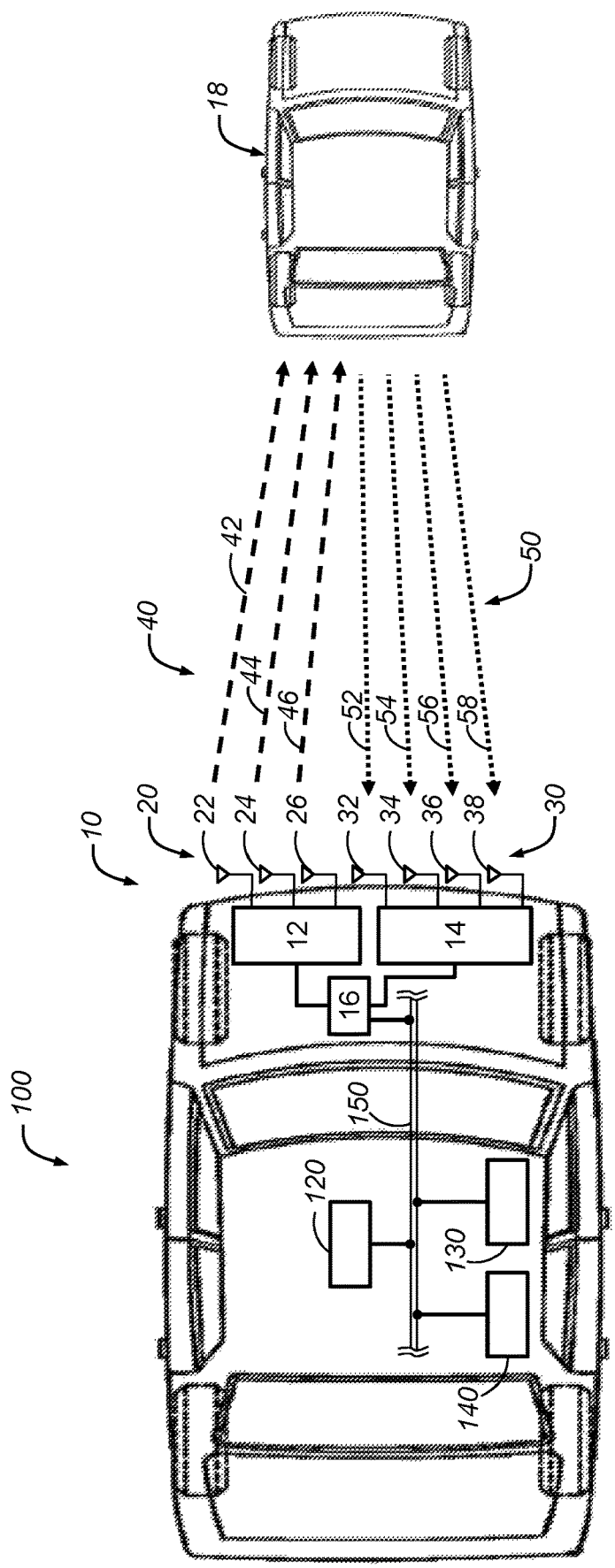
FIG. 1 is a schematic block diagram of a host vehicle and a target object, where the host vehicle includes an example of a vehicle radar system.

The vehicle radar system and method described below are directed to a multiple-input multiple-output (MIMO) radar system and a method for calibrating the vehicle radar system. FIG. 1 illustrates one possible architecture for a MIMO vehicle radar system 10 that can be used to implement the disclosed method. While the approach and methodology described herein relate to the radar configuration shown in FIG. 1, one of ordinary skill in the art will appreciate that vehicle radar system 10 is merely one example, and in many ways, the schematic block diagrams of these figures have been simplified for ease of explanation. Other configurations and embodiments may certainly be used instead, as the vehicle radar system and method described herein represent just one possible example.

The vehicle radar system 10 may be a MIMO system that includes a transmitter 12, a transmit antenna array 20 with a number of transmit antennas 22-26, a receive antenna array 30 with a number of receive antennas 32-38, a receiver 14, a radar control module 16, as well as any other suitable hardware, firmware, software and/or other components that are useful for operation of such a system. According to one example, the transmitter 12 is communicatively coupled to a transmit antenna array 20 having N transmit antennas 22-26 configured to create a sensor field-of-view that monitors a particular zone of interest. The transmit antenna array 20 is configured to transmit electromagnetic signals (i.e., encoded transmit signals) 42-46 that reflect off one or more target objects 18 within the field-of-view of the vehicle radar system 10. According to the non-limiting example shown in FIG. 1, the transmit antenna array 20 is mounted on the front of the host vehicle, includes three transmit antennas 22-26, and is configured to transmit radar signals in a direction generally parallel to the longitudinal axis of the host vehicle. However, this is only one possibility. For instance, the transmit antenna array 20 could be mounted at a location other than on the front of the host vehicle, it may include more or less than three transmit antennas, and it could be oriented in a different direction.

The transmitter 12 may be a stand-alone module or unit; it may be part of a larger module, unit, system, etc.; it may include a number of sub-modules, sub-units, sub-systems, etc.; or it may be configured according to some other arrangement or architecture so long as it is configured to generate electromagnetic signals for transmission over the transmit antenna array 20 in accordance with the method disclosed herein. In one non-limiting example, the transmitter 12 includes a baseband processor that is configured to manage radio operations, including the generation of signals for transmission using the antenna array 20. The baseband processor can include hardware, firmware and/or software typically found on such transmitters, including random access memory (RAM, including static RAM (SRAM) and dynamic RAM (DRAM)) or other types of memory, including flash memory, other solid state memory, or other suitable memory. In other embodiments, the baseband processor of the transmitter 12 is included in a radar control module 16. The transmitter 12 can include waveform generators, oscillators, amplifiers, mixers, combiners, filters, converters and/or processors, to name just a few possible components. By way of example only, a waveform generator may be configured to generate waveforms or signals having different pulse widths, different waveform types and/or different pulse repetition intervals (PRI) within a given coherent processing interval (CPI). The waveforms or signals may then be digitized by a digital to analog (D/A) converter and up converted to a radio frequency carrier using an up converter. The up converter can consist of intermediate frequency (IF) and/or radio frequency (RF) oscillators, filters and/or synchronizing circuits. A transmit amplifier may then generate a transmit signal, which can be fed to a circulator or similar device. Again, this is only one possible configuration for transmitter 12, as numerous other configurations certainly are possible.

Reflected signals 52-58 reflect off the target object 18 and are received as echoes by a receive antenna array 30 having M receive antennas 32-38. According to this non-limiting example, there are three transmit antennas 22-26 (N=3) and four receive antennas 32-38 (M=4). This results in a virtual antenna array having M×N virtual receiver elements (M×N=12 in the illustrated example). The transmit antennas 22-26 and the receive antennas 32-38 can be designed or configured to transmit or receive signals of a particular frequency or frequency range. As mentioned above in conjunction with the transmit antenna array, although the receive antenna array 30 is illustrated in the drawings as being a four antenna array mounted on the front of the host vehicle and pointed in the vehicle forward direction, this is not necessary. The receive antenna array 30 may be mounted on other portions of the vehicle, it may be oriented in other directions, and it may have more or less antenna elements than four, to cite a few possibilities.

The receiver 14 is configured to process and extract information from the reflected signals or echoes that relates to the target object 18 such as, for example, its range, azimuth or azimuth angle (collectively, "azimuth"), elevation or elevation angle (collectively, "elevation"), and range rate or velocity. The receiver 14 may be a stand-alone module or unit; it may be part of a larger module, unit, system, etc. (e.g., the receiver may be part of radar control module 16, it may be part of a module, unit, system, etc. that also includes the transmitter 12, etc.); it may include a number of sub-modules, sub-units, sub-systems, etc.; or it may be configured according to some other arrangement or architecture so long as it is configured to process electromagnetic signals received by the receive antenna array 30 in accordance with the method disclosed herein. According to a non-limiting example, the receiver 14 includes hardware, firmware and/or or software typically found on receivers such as, without limitation, amplifiers, mixers, de-mixers, oscillators, combiners, filters, and converters. The functions performed by receiver 14 may vary, but generally include performing various filtering, amplification, conversion and digitizing functions, as well as signal processing functions like analyzing various properties of the signals and waveforms to determine information such as phase, frequency, and amplitude. As understood by those skilled in the art, the techniques used to extract this information from the signals and waveforms can vary, but may include without limitation, in-phase and quadrature analysis and frequency domain analysis using Fourier transforms. In one embodiment, the receiver 14 may also include components to perform pulse compression and clutter rejection (e.g., Doppler filtering) functions. In at least one embodiment, the transmitter 12 and/or receiver 14 includes a combination of radio receiver circuitry that is configured to carry out the signal processing functionality described herein, such as that shown in FIG. 2.

In one embodiment, the receiver 14 may include a baseband processor, such as the one discussed above with respect to transmitter 12. And, in some embodiments, the transmitter 12 and the receiver 14 can share a common baseband processor, such as one that is included as a part of the radar control module 16. For example, all or certain portions of the receiver 14 can be integrated into the radar control module 16, along with all or certain portions of the transmitter 12. The receiver 14 and/or the radar control module 16 can include a radio chipset that includes an integrated circuit and that is connected to or includes a processor and memory. The receiver 14 and/or radar control module 16 can also include certain components or circuitry configured to interface the radio chipset and circuitry with a vehicle communication system so that the vehicle radar system 10 can communicate with other components, modules and/or systems located throughout the host vehicle and beyond. For example, it is possible for the vehicle radar system 10 to be part of the host vehicle's electronics so that the vehicle radar system can communicate with other vehicle system modules 140 over a central vehicle communication bus 150.

Also, the receiver 14 may include any combination of hardware, firmware and/or software needed to carry out Doppler frequency shift filtering and range filtering so that Doppler frequency shift and range binning (herein "Doppler-range binning") can be performed. The Doppler-range binning can be used to isolate response or echo information regarding particular targets and, in doing so, a plurality of Doppler-range bins can be produced, where each bin is associated with a particular range of values for Doppler frequency shifts and a particular range of values for distances to a target object. In determining whether a particular Doppler-range bin includes information regarding a target object, the receiver 14 can determine whether the energy concentration at or around the Doppler-range bin is above a threshold and, if so, the corresponding information can be used to obtain an array response for that particular Doppler-range bin. In some scenarios, multiple Doppler-range bins may include information informing the vehicle radar system 10 that multiple target objects are detected. In such a case, multiple Doppler-range bins can be used to obtain separated responses for each of the target objects and/or Doppler-range bins. Such separated responses can be used in the radar calibration process discussed in more detail below.

In one particular embodiment, the radar system 10 is implemented on a host vehicle 100, and the transmitter 12, the receiver 14, and/or the radar control module 16 is part of a vehicle control module installed on the host vehicle. In another embodiment, one or more components or pieces of the radar system 10 may be implemented or hosted at a remote facility, such a back end or cloud-based facility. The control module may include any variety of electronic processing devices, memory devices, input/output (I/O) devices, and/or other known components, and may perform various control and/or communication related functions. Depending on the particular embodiment, the control module may be a stand-alone vehicle electronic module, it may be incorporated or included within another vehicle electronic module (e.g., a steering control module, brake control module), or it may be part of a larger network or system (e.g., autonomous driving system, a traction control system (TCS), electronic stability control (ESC) system, antilock brake system (ABS), driver assistance system, adaptive cruise control system, lane departure warning system), to name a few possibilities. Such a control module is not limited to any one particular embodiment or arrangement.

Additionally, a vehicle electronics system can include various vehicle modules, including an engine control unit (ECU) 120, an onboard computer 130, and other VSMs 140. The ECU 120 can be used to control various aspects of engine operation such as fuel ignition and ignition timing. The ECU 120 is connected to communications bus 150 and may receive operation instructions from a body control module (BCM) (not shown) or other VSMs, including onboard computer 30. The ECU 120 may control an internal combustion engine (ICE) and/or electric propulsion motors (or other primary mover(s)).

Onboard computer 130 is a vehicle system module that includes a processor and memory. Additionally, at least in some embodiments, onboard computer 30 can be an infotainment unit (e.g., infotainment head unit, in-car entertainment (ICE) unit, in-vehicle infotainment (IVI)), a vehicle head unit, a center stack module (CSM), or vehicle navigation module. The processor can be used to execute various types of digitally-stored instructions, such as software or firmware programs stored in memory, which enable the computer 130 to provide a wide variety of services. In one embodiment, the processor can execute programs or process data to carry out at least a part of the method discussed herein. For example, the processor can receive signals or data from various vehicle system modules (e.g., VSM 140), including sensor data. In a particular embodiment, the onboard computer 130 can determine when to initiate the method 200 (discussed below in FIG. 2). For example, the onboard computer 130 can receive sensor data from a vehicle sensor (e.g., a camera, radar, lidar, or other sensor installed on the vehicle) and, based on the received sensor data, it can be determined that velocity information (and/or other information, including spatial information) is desired regarding a target object 18. Such information may be desirable when, for example, the vehicle is carrying out autonomous and/or semi-autonomous operations.

As mentioned, at least in some embodiments, the radar control module 16 includes a processor and memory and, in some embodiments, transmitter 12 and/or receiver 14 include a processor and memory. The processor can be any type of device capable of processing electronic instructions including microprocessors, microcontrollers, host processors, controllers, vehicle communication processors, and application specific integrated circuits (ASICs). The memory may include RAM, other temporary powered memory, any non-transitory computer-readable medium (e.g., EEPROM), or any other electronic computer medium that stores some or all of the software needed to carry out the various radio and/or signal processing functions discussed herein.

Figure 2:
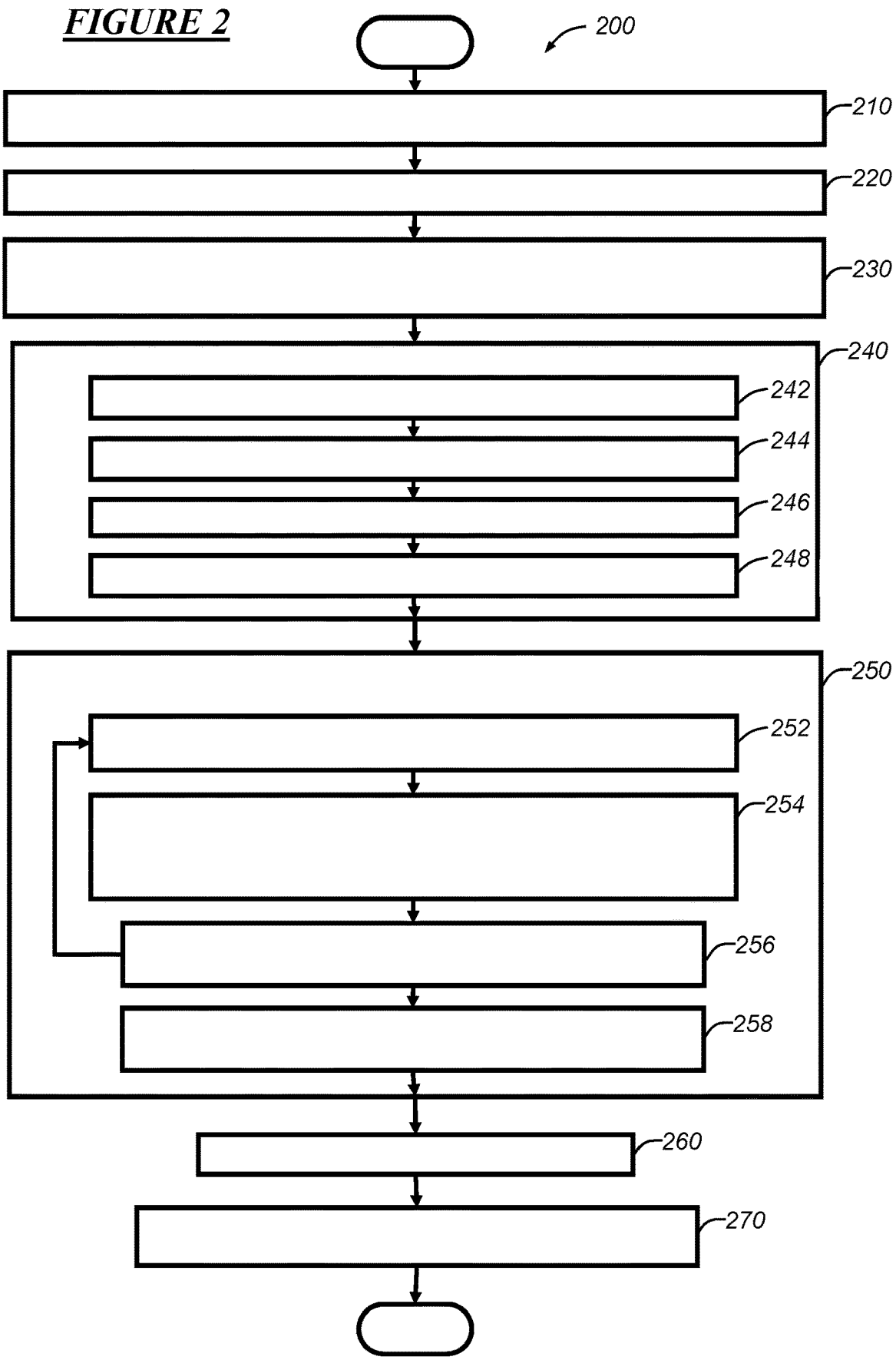
FIG. 2 is a flow chart depicting an example of a method for calibrating a vehicle radar system.

FIG. 2 illustrates a flow chart depicting an exemplary method 200 of calibrating a vehicle radar system so that more accurate information regarding target objects can be obtained. According to one example, method 200 implements a calibration searching process that may use various techniques, such as an iterative cost optimization process with gradient descent techniques. As a result of the calibration searching process, new calibration matrices are identified that can be used to calibrate the vehicle radar system so that a more accurate beamforming image can be obtained. It should be understood that it is not necessary for the steps in method 200 to be performed in the particular order or sequence shown and described, and that performance of some or all of the steps in an alternative order is certainly possible. In one non-limiting example, all or some of the steps in method 200 are performed by the vehicle radar system 10 as a standalone system or as part of a larger vehicle system.

The method 200 may be initiated or started in response to any number of different events, circumstances, scenarios, conditions, etc. For example, method 200 may begin when the host vehicle 100 is turned on (e.g., when the vehicle ignition is energized and starts the vehicle) or put in drive, and then the method could continuously, periodically, intermittently or otherwise run in the background. According to another example, the method 200 may begin in response to an indication that the vehicle radar system 10 is not properly calibrated (e.g., when a forward facing camera on the host vehicle captures images of a target object and information derived from those images is inconsistent with information from the vehicle radar system 10). In yet another example, the method 200 may be started whenever certain vehicle functions or features that require input from the vehicle radar system 10 are engaged or otherwise activated (e.g., when one or more autonomous or semi-autonomous driving features are activated). It is also possible for the method 200 to be initiated on a periodic or routine basis (e.g., once a minute, hour, day, week, month, etc.). The aforementioned examples only represent some of the ways that method 200 can be initiated or started, as other ways, like a manual initiation of the calibration method, exist as well.

Beginning with step 210, the method generates one or more transmit signals $T_x$ and can do so according to a number of different techniques. According to one such technique, a waveform generator in the transmitter 12 generates a modulated signal $MS_1$ in the form of a baseband signal that is centered around a carrier frequency. The modulated signal $MS_1$ may have a bandwidth corresponding to linear frequency modulation (LFM) chirps or pulses, for example. The modulated signal $MS_1$ can be any appropriate or suitable modulated signal or waveform for use with the vehicle radar system 10, including modulated signals having a center frequency that is between 10 and 100 GHz. In one embodiment where the vehicle radar system 10 is mounted to the front of a vehicle, the waveform generator produces a modulated signal $MS_1$ with a center frequency of approximately 77 to 81 GHz.

Once a modulated signal $MS_1$ is generated, the modulated signal $MS_1$ can be processed according to a communication access scheme to obtain transmit signals $T_{x1}$-$T_{xN}$. Various communication access schemes can be used, including time difference multiple access (TDMA), code division multiple access (CDMA), binary phase modulation (BPM), code division multiplexing (CDM), orthogonal frequency division multiplexing (OFDM), and other suitable techniques. In one embodiment, the modulated signal $MS_1$ can be mixed with a code sequence ($C_1$ to $C_N$) to produce a number of transmit signals $Tx_1$ to $Tx_N$, where the code sequence includes at least one separate code for each of the transmit antennas in the transmit antenna array 20. Typically, the number of codes in the code sequence ($C_1$ to $C_N$) is equal to the number of transmit antennas in the transmit antenna array 20 (e.g., in FIG. 1, N=3 such that there are three codes ($C_1$ to $C_N$) and three transmit antennas 22-26). As used herein, the terms "mix," "de-mix," "mixes," "de-mixes," "mixing," "de-mixing," "mixer," "de-mixer" and its other forms broadly include any suitable signal processing techniques that mix, de-mix, modulate, demodulate, encode, decode, multiply and/or otherwise apply or extract a code or codeword to or from a modulated signal or waveform. In one example, step 210 uses frequency mixers to mathematically multiply the initial modulated signal $MS_1$ with three separate codes ($C_1$ to $C_3$) to obtain output signals in the form of transmit signals $T_{x1}$-$T_{x3}$. The codes may be orthogonal codes that can be used to separate transmission channels among the different transmit antennas so that the signals received at receiver 14 can be correspondingly separated. Such an encoding technique is oftentimes useful since, when multiple signals are transmitted at the same time in the same frequency range, the sum of all of these transmissions is received at the receiver 14. By mixing the transmitted signals with different codes (e.g., orthogonal codes), the sum or combination of the received signals can then be de-mixed at the receiver 14 so that the separately transmitted signals can be separated or parsed out.

According to the non-limiting example of FIG. 1, the vehicle radar system 10 includes a transmit antenna array 20 having three transmitting antennas 22-26 (N=3) and, accordingly, a code sequence with three codes may be used ($C_1$, $C_2$, $C_3$), one for each transmit antenna. The first code $C_1$ can then be mixed with the modulated signal $MS_1$ to obtain a first transmit signal $Tx_1$. Similarly, the second code $C_2$ can be mixed with the modulated signal $MS_1$ to obtain a second transmit signal $Tx_2$, and the third code $C_3$ can be mixed with the modulated signal $MS_1$ to obtain a third transmit signal $Tx_3$. It should be appreciated that mixing and/or modulating techniques, other than those described above, may be used to generate transmit signals $Tx_1$ to $Tx_N$. The method may then continue to step 220.

In step 220, the method transmits or sends transmit signals $Tx_1$ to $Tx_N$ using the transmit antenna array 20 having N number of transmit antennas. For example, when carrying out the method with the vehicle radar system 10 (where N=3), three transmit signals $Tx_1$, $Tx_2$, $Tx_3$ are transmitted, with the first transmit antenna 22 transmitting signal $Tx_1$, the second transmit antenna 24 transmitting signal $Tx_2$, and the third transmit antenna 26 transmitting signal $Tx_3$. FIG. 1 schematically illustrates three electromagnetic signals 42-46 that are transmitted by antennas 22-26. In one embodiment, the transmit signals $Tx_1$ to $Tx_N$ are transmitted or sent at the same time over the same frequency band. In other embodiments, the transmit signals $Tx_1$ to $Tx_N$ can be sent at different times, using different frequencies (e.g., using different center frequencies), using different codes, etc. The transmit signals $Tx_1$ to $Tx_N$ can be sent using techniques appreciated by those skilled in the art such as, for example, binary phase modulation (BPM), code division multiplexing (CDM), code division multiple access (CDMA), time division multiple access (TDMA), as well as any other suitable technique. The method is not limited to any particular technique. Next, the method proceeds to step 230.

In step 230, a plurality of receive signals $Rx_1$ to $Rx_M$ are received at the receive antenna array 30 and they include at least one receive signal for each receive antenna in the receive antenna array. To illustrate, the collection of transmit signals $Tx_1$ to $Tx_N$ reflect off the target object 18 in the form of reflected signals 52-58, which in turn are received at each of the M number of receive antennas in the form of receive signals $Rx_1$ to $Rx_M$. Thus, each of the receive signals $Rx_1$ to $Rx_M$ represents the sum or collection of transmit signals $Tx_1$ to $Tx_N$ (these signals have not been decoded or separated yet), but because the transmission paths to the different receive antennas 32-38 are slightly different, the receive signals $Rx_1$ to $Rx_N$ are somewhat different (e.g., because of its relative position within the receive antenna array 30, antenna 32 may receive signal 52 slightly before antenna 34 receives signal 54 and so on). In this sense, the receive signals $Rx_1$ to $Rx_M$ represent data that is sampled or gathered from the electromagnetic waves 52-58 that reflect off the target object 18 in the radar system field-of-view. For example, reflected electromagnetic waves 52-58 arrive at the receive antennas 32-38 and can be sampled at a sampling frequency $F_s$ and processed according to known techniques to obtain the receive signals $Rx_1$ to $Rx_M$. According to a non-limiting example, the hardware and/or software used to perform such steps and to process the receive signals $Rx_1$ to $Rx_M$ is part of the receiver 14.

In step 240, the method performs a pre-beamforming process on the received signals $Rx_1$ to $Rx_M$. Pre-beamforming processing can include separating the received signals $Rx_1$ to $Rx_M$ (step 242), performing Doppler frequency shift filtering and/or range filtering (i.e., Doppler-range binning) (step 244), and selecting one or more Doppler-range bins to obtain one or more Doppler-range responses, each of which corresponds to a particular target object (step 246). In general, the pre-beamforming process of step 240 is typically used to help the method filter out unwanted signals and to discriminate or distinguish between different target objects in the sensor field-of-view so that the method can calibrate the vehicle radar system with respect to one target object at a time.

In step 242, each of the receive signals $Rx_1$ to $Rx_M$ is de-mixed (or mixed) with codes $C_1$ to $C_N$ to obtain separated receive signals $S_{1,1}$ to $S_{M,N}$. To illustrate, the receive signal $Rx_1$ is inputted to and de-mixed by frequency mixers with the same code sequence $C_1$ to $C_3$ previously used in step 210; this results in separated receive signals $S_{1,1}$ to $S_{1,N}$. In this example, because three codes $C_1$ to $C_3$ are applied to receive signal $Rx_1$, three decoded or separated receive signals $S_{1,1}$ to $S_{1,3}$ are produced that correspond to receiving antenna 32 ($Rx_1$); the same would occur for the other three receiving antennas 34-38 such that a total of twelve separated receive signals are produced. Each of the separated receive signals $S_{1,1}$ to $S_{M,N}$ includes position information relating to a target object (e.g., the separated receive signals may include position information in the form of elevation, azimuth, range and/or Doppler frequency shift data, but position information may include any data pertaining to the position, velocity and/or acceleration of a target object). Various filtering and/or other signal processing techniques can be carried out on the receive signals $Rx_1$ to $Rx_M$ and/or the separated receive signals $S_{1,1}$ to $S_{M,N}$. Step 242 can be carried out in conjunction with a CDM or CDMA technique, for example.

In other embodiments, such as those that do not use CDM or CDMA techniques, the separated receive signals $S_{1,1}$ to $S_{M,N}$ can be obtained according to the particular technique used, as is appreciated by those skilled in the art. For example, when using a TDMA technique, the first transmit antenna 22 can be used to transmit a transmit signal $Tx_1$ and this signal can be received at each receive antenna $Rx_1$ to $Rx_M$ to obtain M receive signals. These signals may already be separated due to the nature of the TDMA technique and, thus, the separating step (step 242) may not be needed. In such a case, the M receive signals $Rx_1$ to $Rx_M$ that were obtained based on the single transmit signal $Tx_1$ from the first transmit antenna correspond to the separated receive signals $S_{1,1}$ to $S_{M,1}$. Subsequent transmit signals $Tx_2$ to $Tx_N$ can be transmitted and received in a like manner to obtain the remaining separated receive signals $S_{1,2}$ to $S_{M,N}$. Thus, in various scenarios, M×N separated receive signals are obtained, with each of the separated receive signals $S_{1,1}$ to $S_{M,N}$ corresponding to a particular transmitter-receiver pair.

In step 244, the separated receive signals $S_{1,1}$ to $S_{M,N}$ are filtered based on Doppler frequency shift and/or range filtering. The separated receive signals $S_{1,1}$ to $S_{M,N}$ can be organized or grouped into Doppler-range bins, with each Doppler-range bin including signals that have substantially the same Doppler-frequency shift f and/or range r. In this way, the method is able to distinguish between different target objects within the sensor field-of-view, as all signals having substantially the same Doppler-frequency shift f and/or range r will likely be associated with the same target object. The Doppler frequency shift f can be represented as a single value or it may be represented by a range of values and, according to one example, the observed Doppler frequency shift for each of the separated receive signals $S_{1,1}$ to $S_{M,N}$ is rounded to a single, nearby Doppler frequency shift fusing rounding techniques known to those skilled in the art. In a like manner, the range or distance r to the target object can be represented by a single value or a range of values. Once a Doppler-frequency shift f and/or range r has been determined for the separated receive signals $S_{1,1}$ to $S_{M,N}$, these signals can be assigned or associated with the different Doppler-range bins or groups so that the method can then focus on the signals of a particular target object.

In step 246, one or more Doppler-range bins may be selected, each of which corresponds to a particular target object. Each of the Doppler-range bins can be analyzed to determine whether the information contained or associated with that particular Doppler-range bin adequately indicates the presence of a target object. In one embodiment, a minimum energy threshold (or reflection intensity) can be used to determine whether a particular Doppler-range bin adequately indicates the presence of a target object. In some scenarios, none of the Doppler-range bins may exceed the minimum energy threshold and, in such a case, the method 200 can proceed back to step 210 to be carried out again. Once a Doppler-range bin is selected, the method proceeds to step 248.

In step 248, a receive antenna response for each selected Doppler-range bin is obtained that includes position information regarding one or more target objects. According to one non-limiting example, the receive antenna response $X_k$ includes azimuth and elevation information for a given Doppler-range bin (i.e., for a given target object having substantially the same Doppler frequency shift f and/or range r readings), where k represents the index of the selected Doppler-range bin (k is an index between 1 and K, where K represents the number of selected Doppler-range bins). The receive antenna response $X_k$ may be represented or expressed in any number of suitable forms, including in the form of a multi-dimensional data structure, such as a 2D matrix or array with N×M number of elements where N is the number of transmit antennas and M is the number of receive antennas. Using the vehicle radar system 10 shown in FIG. 1 as an illustrative example, the receive antenna response $X_k$ may be expressed as a multi-dimensional matrix or array having N×M=3×4=12 virtual antenna elements, where each element is provided with position information in the form of azimuth and elevation information. In such an example, it would be unnecessary for the elements to also include Doppler frequency shift f and/or range r information, as such position information would already be known from the selected Doppler-range bin. It should be recognized that the receive antenna response $X_k$ may be represented or expressed in any number of other formats and it is not limited to the exemplary matrix or array described above (e.g., position information in the form of Cartesian, polar and/or other coordinates could be used instead of spherical coordinates).

In one scenario, only a single Doppler-range bin may be selected (K=1) indicating that only a single target object is in the radar's field of view. In other embodiments, a plurality of Doppler-range bins may be selected indicating that a plurality of target objects are in the radar's field of view. In such a case, multiple receive antenna responses $X_k$ would be obtained, including a first receive antenna response $X_1$, a second receive antenna response $X_2$, and so on. Each of these receive antenna responses $X_k$ can, thus, include azimuth, elevation and/or other information concerning N×M virtual antenna elements. Once the receive antenna responses $X_k$ are obtained, the method 200 continues to step 250.

In some embodiments, each iteration of steps 210 through 248 corresponds with a single receive radar frame j, such that multiple iterations or cycles of this group of steps results in multiple receive antenna responses $X_{k,j}$, where k represents the Doppler-range bin and j represents the receive radar frame or cycle. Thus, the sequence of steps 210 through 248 can be carried out J times to obtain at least J number of receive antenna responses $X_{k,j}$, each of which is associated with a particular target object as observed in a single receive radar frame. Moreover, for each receive radar frame j (during each iteration of steps 210 through 248), the number of target objects K may vary, but information pertaining to at least one target object for each iteration of steps 210 through 248 will be used to generate a receive antenna response $X_{k,j}$. And, the variable $K_j$ can represent the number of target objects for a given receive radar frame j.

In one embodiment, steps 250 through 270 can be carried out after a single iteration of steps 210 through 248 (J=1). Or, in other embodiments, steps 250 through 270 can be carried out after a certain number of iterations of steps 210 through 248, such as after 10 iterations (J=10) where at least 10 receive antenna responses $X_{k,j}$ are obtained (i.e., 10 receive radar frames, each of which includes a receive antenna response for one or more target objects (K≥1)). In such an embodiment, the method may continue to loop back to step 210 until the requisite number of frames or cycles is met, after which the method may proceed to step 250. The number of frames, cycles and/or iterations can vary and may be dependent on the current operating state and/or environment of the vehicle 100 or vehicle radar system 10, or the value of blurring metrics that are derived from previous receive radar frames, to cite a few possibilities. Furthermore, when using the iterative cost optimization searching process described herein, the number of iterations may not be known until the stopping conditions are met, which can be during or after the last iteration in many instances, for example.

In step 250, the method searches for new calibration matrices $\hat{C}_1$ and $\hat{C}_2$. These matrices can be similar in nature to hypothesized calibration matrices $C_1$ and $C_2$, but may differ in the sense that the new calibration matrices $\hat{C}_1$ and $\hat{C}_2$ are the matrices being searched for and the hypothesized calibration matrices $C_1$ and $C_2$ are those that are already known at the beginning of the method or that are being evaluated in the calibration searching process. The number of calibration matrices searched for can be equal to the number of dimensions used to form the beamforming images, which are two in the example provided above (e.g., one calibration matrix $C_1$ for azimuth and one calibration matrix $C_2$ for elevation). For example, a new calibration matrix $\hat{C}_1$ for azimuth can be searched for, as well as a new calibration matrix $\hat{C}_2$ for elevation. Various different searching or optimization techniques can be used to obtain accurate and new calibration matrices $\hat{C}_1$ and $\hat{C}_2$. For example, an iterative cost optimization searching process that implements gradient descent techniques can be used or a predetermined calibration hypotheses testing process can be used. Both processes generally involve searching for the hypothesized calibration matrix sets $\{C_{1,p}, C_{2,p}\}$ that resolve to the lowest blurriness score or a sharper beamforming image, which is a function of the beamforming image and the hypothesized calibration matrices $C_{1,p}$, $C_{2,p}$, where p is the index of the hypothesized calibration matrix sets. The hypothesized calibration matrices $C_{1,p}$, $C_{2,p}$ that are associated with the lowest blurriness score can be selected or obtained as a result of the calibration searching process (such as in steps 252-258) discussed below. Based on the selected hypothesized calibration matrices $C_{1,p}$, $C_{2,p}$, new calibration matrices $\hat{C}_1$ and $\hat{C}_2$ are obtained that can then be used to better calibrate the vehicle radar system 10.

As mentioned, step 250 can involve using an iterative cost optimization searching process (e.g., a process that implements gradient descent techniques) or a predetermined calibration hypotheses testing process. Both of these processes involve obtaining hypothesized calibration matrices $C_{1,p}$, $C_{2,p}$ (step 252), obtaining a beamforming image $Y_{k,j,p}$ using the new hypothesized calibration matrices $C_{1,p}$, $C_{2,p}$ (step 254), deriving blurring metric(s) $g_{k,j,p}$ for the hypothesized calibration matrices $C_{1,p}$, $C_{2,p}$ (step 256), and selecting hypothesized calibration matrices $C_{1,p}$, $C_{2,p}$ that are associated with the best beamforming image resolution (e.g., the lowest blurring metric $g_{k,j,p}$) (step 258). The iterative cost optimization searching process can iteratively derive the next hypothesized calibration matrices $C_{1,p}$, $C_{2,p}$, whereas the predetermined calibration hypotheses testing process can retrieve predetermined hypothesized calibration matrices from memory. However, in general, the calibration searching process (e.g., steps 252 through 256) can be carried out P number of times to derive blurring metric(s) $g_{k,j,p}$ for each hypothesized calibration matrix sets $\{C_{1,p}, C_{2,p}\}$ (where p is the index of the iteration of the steps 252-256 such that p indicates the hypothesized calibration matrix set $\{C_{1,p}, C_{2,p}\}$ being tested). Thus, steps 252-256 result in a blurring metric $g_{k,j,p}$ for each beamforming image $Y_{k,j,p}$ that is obtained using the set of hypothesized calibration matrix sets $\{C_{1,p}, C_{2,p}\}$ as well as the receive antenna responses $X_{k,j}$. Then, after P iterations of steps 252-256, hypothesized calibration matrices $C_{1,p}$, $C_{2,p}$ are selected based on the blurring metrics $g_{k,j,p}$ and used to obtain new calibration matrices $\hat{C}_1$ and $\hat{C}_2$ (step 260). In some embodiments, the hypothesized calibration matrices $C_{1,p}$, $C_{2,p}$ associated with the lowest blurring metric $g_{k,j,p}$ are selected as the new calibration matrices $\hat{C}_1$ and $\hat{C}_2$ and, in other embodiments, a weighting function is used to obtain the new calibration matrices $\hat{C}_1$ and $\hat{C}_2$ based on the hypothesized calibration matrices $C_{1,p}$, $C_{2,p}$ associated with the lowest blurring metric $g_{k,j,p}$.

Figure 3:
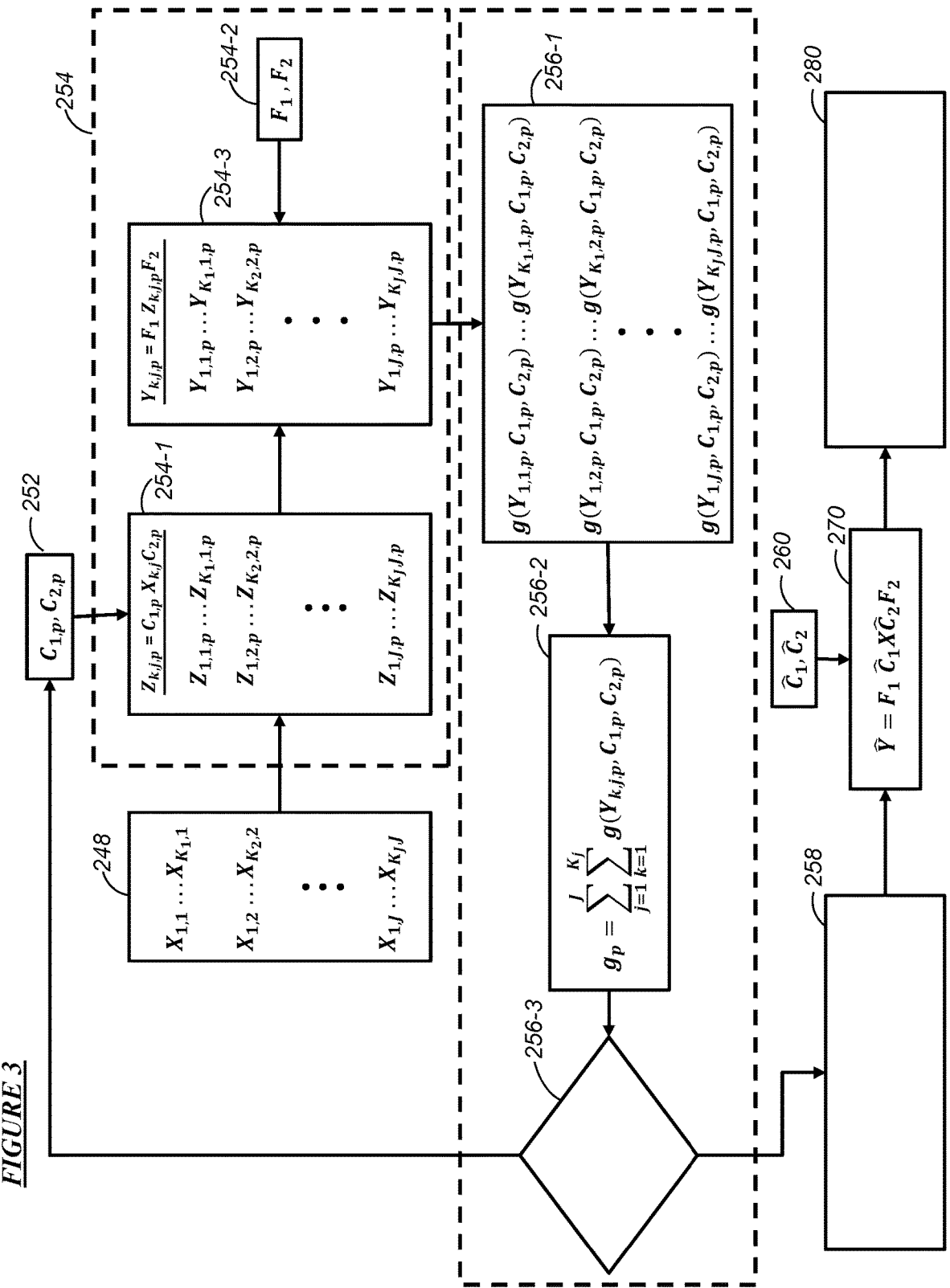
FIG. 3 is a flow chart depicting a detailed embodiment of several of the steps in the flowchart of FIG. 2, including those associated with a calibration searching process.

With reference to FIG. 3, there is shown a detailed flow chart depicting various inputs and outputs used in one embodiment of the calibration searching process. The reference numerals correspond to those used in FIG. 2 and, thus, the following description of steps 250 through 270 of the method 200 will be made with reference to both FIGS. 2 and 3.

In step 252, an initial or first set of hypothesized calibration matrices $C_{1,1}$ and $C_{2,1}$ is obtained in one of a number of potential ways. As will be explained in more detail, step 252 will likely be performed or carried out multiple times (i.e., multiple iterations during the course of method 200). On the first or initial iteration of step 252, the method may obtain a first set of hypothesized calibration matrices $C_{1,1}$ and $C_{2,1}$ by retrieving them from memory in the vehicle radar system 10 or elsewhere; in subsequent iterations of step 252, the method for obtaining hypothesized calibration matrices will likely be different. For example, the first set of hypothesized calibration matrices $C_{1,1}$ and $C_{2,1}$ may be predetermined calibration matrices having default calibration information that are saved in memory in the vehicle radar system 10. In a different example, the first set of hypothesized calibration matrices $C_{1,1}$ and $C_{2,1}$ may be previously saved calibration matrices, perhaps ones derived from calibration information generated during a previous iteration(s) of method 200. In any event, the initial hypothesized calibration matrices $C_{1,1}$ and $C_{2,1}$ may be obtained and saved as the first entries in a hypothesized calibration matrix set $\{C_{1,p}, C_{2,p}\}$, where p represents the number of iterations or cycles of the method. It should be noted that the term "hypothesized calibration matrix set $\{C_{1,p}, C_{2,p}\}$" is used interchangeably with the term "plurality of hypothesized calibration matrices $C_{1,1}$-$C_{1,p}$ and $C_{2,1}$-$C_{2,p}$." Each of these matrices includes calibration information relating to the vehicle radar system (e.g., these matrices may include calibration information in the form of elevation and/or azimuth calibration data for attempting to correct signals from the receive antenna array, but calibration information may include any data pertaining to the attempted calibration of the vehicle radar system).

During subsequent iterations of steps 252-256, new hypothesized calibration matrices can be obtained by carrying out a cost optimization technique using a blurring metric cost function $g(Y_{k,j,p}, C_{1,p}, C_{2,p})$, as will be explained. In one embodiment, an iterative calibration searching process that implements gradient descent techniques can be used. For instance, gradient descent techniques can be carried out using the hypothesized calibration matrices $C_{1,p}, C_{2,p}$ of the present iteration p along with the blurring metric cost function $g(Y_{k,j,p}, C_{1,p}, C_{2,p})$ to obtain hypothesized calibration matrices $C_{1,p+1}, C_{2,p+1}$ to be used in the next iteration (p+1), if there is one. When using the gradient descent technique (or other cost optimization technique), the number of iterations P can be dependent on how fast an optimized local minimum value (e.g., blurring metric) is obtained or based on when certain stopping conditions are met, as discussed more below.

In other embodiments, a predetermined calibration hypotheses testing process can be used to obtain a plurality of blurring metrics $g_{1,1,1}$ to $g_{K,J,P}$ for each of the P number of hypothesized calibration matrices $C_{1,p}, C_{2,p}$, and each of the target objects (or antenna receive responses) k of each receive radar frame j. In this embodiment, P number of hypothesized calibration matrix sets $\{C_{1,1}, C_{2,1}\}$-$\{C_{1,P}, C_{2,P}\}$ can be stored in memory of the vehicle radar system 10 or elsewhere and then retrieved from the memory when step 252 is reached. When carrying out the predetermined calibration hypotheses testing process, step 252 would include retrieving the hypothesized calibration matrix set $\{C_{1,p}, C_{2,p}\}$ for the present iteration p. At the conclusion of step 252, a hypothesized calibration matrix set $\{C_{1,p}, C_{2,p}\}$ will have been generated, identified and/or otherwise obtained. Next, the method 200 continues to step 254.

In step 254, a beamforming process is carried out to obtain a beamforming image. The beamforming process can involve numerous sub-steps, including multiplying a hypothesized calibration matrix set $\{C_{1,p}, C_{2,p}\}$ by a receive antenna responses $X_{k,j}$ to obtain a calibrated array response $Z_{k,j,p}$ (sub-step 254-1), obtaining beamformer matrices $F_1$ and $F_2$ (sub-step 254-2), and calculating a beamforming image $Y_{k,j,p}$ (sub-step 254-3). As mentioned, the method can be carried out for more than one receive radar frame j, each of which can include one or more target objects k. In such a case, the hypothesized calibration matrix set $\{C_{1,p}, C_{2,p}\}$ can be multiplied by each of the receive antenna responses $X_{1,1}$ to $X_{K,J}$ to obtain a plurality of calibrated array responses $Z_{1,1,1}$ to $Z_{K,J,P}$, as is depicted in block 254-1 of FIG. 3. Each calibrated array response $Z_{k,j,p}$ represents a receive antenna response $X_{k,j}$ that has been calibrated using a hypothesized calibration matrices $C_{1,p}, C_{2,p}$. The first hypothesized calibration matrix $C_{1,p}$ can represent calibration values for azimuth information and the second hypothesized calibration matrix $C_{2,p}$ can represent calibration values for elevation information. Also, as mentioned above, although the method 200 provides an example of calibrating the vehicle radar system 10 for two-dimensions (azimuth and elevation) and thereafter obtaining two-dimensional information regarding target object(s), the method is not limited to two dimensions. For instance, the method may be adapted to calibrate for one- or three-dimensions and to obtain one- or three-dimensional information, instead.

In step 254-1, one or more calibrated array responses $Z_{1,1,p}$ to $Z_{K,J,p}$ for each iteration p are obtained. In one embodiment, each of the receive antenna responses $X_{k,j}$ is multiplied by the hypothesized calibration matrices $C_{1,p}, C_{2,p}$ to obtain a calibrated array response $Z_{k,j,p}$ using the following equation:

$$Z_{k,j,p} = C_{1,p} X_{k,j} C_{2,p} \quad \text{(Equation 1)}$$

Equation 1 can be carried out for each target (represented by subscript combination k,j, where k is the index for the target of the j-th receive radar frame (or iteration of steps 210 through 240)) to obtain at least J calibrated array responses $Z_{1,1,p}$ to $Z_{K,J,p}$ (since K≥1). Once the calibrated array responses $Z_{1,1,p}$ to $Z_{K,J,p}$ are obtained, then the beamforming images can be obtained.

In step 254-2, the beamformer matrices $F_1$ and $F_2$ are obtained and, in one embodiment, $F_1$ can be a beamformer matrix applied on the vertical antenna elements of the array for elevation information and $F_2$ can be a beamformer matrix applied on the vertical antenna elements of the array for azimuth information. In some embodiments, the beamformer matrices can be stored in memory of the vehicle radar system 10, such as in the radar control module 16. After the beamformer matrices $F_1$ and $F_2$ are obtained, the method can continue to step 254-3, where beamforming images are calculated.

In step 254-3, a beamforming image for each calibrated array response can be obtained for the present iteration. The beamforming image $Y_{k,j,p}$ thus represents the beamforming image for a given target object k of the j-th receive radar frame (or a given Doppler-range bin k of the j-th receive radar frame), and p corresponds to the index of the hypothesized calibration matrices $C_{1,p}, C_{2,p}$ being tested during the present iteration of steps 252-256. The beamforming image $Y_{k,j,p}$ can include two-dimensional information, including azimuth and elevation information, and, in such a case, the beamforming image can be referred to as the 2D beamforming image $Y_{k,j,p}$. As mentioned above, in other embodiments, the calibration and/or beamforming process may involve information of a single dimension and, in such a case, a 1D beamforming image $Y_{k,j,p}$ can be obtained.

In one embodiment, the 2D beamforming images $Y_{1,1,p}$ to $Y_{K,J,p}$ can be obtained using the following equation:

$$Y_{k,j,p} = F_1 Z_{k,j,p} F_2 \qquad \text{(Equation 2)}$$

where $F_1$ is a beamformer matrix applied on the vertical antenna elements of the 2D array for elevation information (referred herein as the elevation beamformer matrix $F_1$), $F_2$ is the beamformer matrix applied on the horizontal elements for azimuth resolution (referred herein as the azimuth beamformer matrix), $Y_{k,j,p}$ is the 2D beamforming image for the receive antenna response $X_{k,j}$ as calibrated using the hypothesized calibration matrices $C_{1,p}, C_{2,p}$ (where k is the index of the target object within the receive radar frame j, and p is the index of the hypothesized calibration matrices $C_{1,p}, C_{2,p}$ being tested). For example, in a 2D planar uniformly spaced array, calibrated array response $Z_{k,j,p}$ can include A number of rows and B number of columns, such that each matrix element represents a virtual antenna element. Thus, in such an example, the elevation beamformer matrix $F_1$ can be the Bartlett beamforming matrix applied on the columns of virtual antennas in the 2D array of $Z_{k,j,p}$. In a like manner, the azimuth beamformer matrix $F_2$ can be the Bartlett beamforming matrix applied on the rows of the virtual antenna elements in the 2D array of $Z_{k,j,p}$.

In the case of a one-dimensional beamforming image (e.g., where A=1 or where B=1), the dot product of the elevation beamformer matrix $F_1$ and the first calibration matrix $C_{1,p}$ will result in a scalar of 1 (i.e., will become eliminated) and, thus, only the azimuth beamformer matrix $F_2$ and the second calibration matrix $C_{2,p}$ are left. Thus, only azimuth information is then included in the 1D beamforming image $Y_{k,j,p}$. In such a case, the remaining steps of method 200 can be used to improve the second calibration matrix $C_{2,p}$. Once the beamforming images are obtained, the method 200 proceeds to step 256.

In step 256, blurring metrics are obtained. As depicted in FIG. 3, step 256 can include three sub-steps 256-1, 256-2, and 256-3. In sub-step 256-1, a blurring metric cost function $g(Y_{k,j,p}, C_{1,p}, C_{2,p})$ is applied to each beamforming image $Y_{k,j,p}$, each of which corresponds to a hypothesized calibration matrix set $\{C_{1,p}, C_{2,p}\}$. Once each of these values are calculated (sub-step 256-1), then an overall blurring metric $g_p$ for the hypothesized calibration matrix set $\{C_{1,p}, C_{2,p}\}$ can be derived (sub-step 256-2). Thereafter, as depicted in sub-step 256-3, the method can continue back to step 252 when another iteration is desired, such as when the stopping conditions of the iterative cost optimization searching process are not met; otherwise, the method 200 can continue to step 258.

In sub-step 256-1, the blurring metrics can be represented by $g_{k,j,p}$ and can be determined using the blurring metric cost function $g(Y_{1,p}, C_{1,p}, C_{2,p})$. The blurring metric cost function $g(Y_{k,j,p}, C_{1,p}, C_{2,p})$ can be various types of radar blurring algorithms or functions that determine the blurriness of the beamforming image $Y_{k,j,p}$. For example, edge detection techniques can be applied that can determine the sharpness of the beamforming image around an edge. Larger changes of intensity around an edge can indicate a sharper image than those with smaller changes of intensity. In some embodiments, a high pass filter can be used to determine the sharpness or blurriness of the beamforming image $Y_{k,j,p}$. It should be appreciated that the blurring metric(s) may include any information that is generally representative of the quality or resolution of the beamforming image including, but certainly not limited to, the blurriness, sharpness and/or resolution of the beamforming image. Various other techniques known to those skilled in the art can be used to determine the resolution of the beamforming image $Y_{k,j,p}$.

In sub-step 256-2, an overall blurring metric $g_p$ can be calculated for the hypothesized calibration matrix set $\{C_{1,p}, C_{2,p}\}$. For example, the blurring metrics for a given iteration p can all be summed together to obtain an overall blurring metric $g_p$. Thus, where p=1, the blurring metrics $g_{1,1,1}$ to $g_{K,J,1}$ can be summed together to obtain the overall blurring metric $g_1$. This can be done for each set of hypothesized calibration matrices $C_{1,p}, C_{2,p}$ to obtain P overall blurring metrics $g_1$ to $g_P$. For example, the following equation can be used to obtain the overall blurring metric $g_p$ for a given iteration p:

$$g_p = \sum_{j=1}^{J} \sum_{k=1}^{K_j} g_{k,j,p}$$

where $g_p$ is the overall blurring metric for the hypothesized calibration matrix set $\{C_{1,p}, C_{2,p}\}$, J is the number of receive radar frames (with j as the index), and $K_j$ is the number of target objects (or Doppler-range bins) for the receive radar frame j (with k as the index). However, as discussed below, other embodiments may not include the step of calculating an overall blurring metric $g_p$, but may instead use the blurring metrics $g_{k,j,p}$ to determine which hypothesized calibration matrix set to select.

In sub-step 256-3, the method 200 can determined whether another iteration of the calibration searching process is to be carried out. In one embodiment where a cost optimization technique, such as a gradient descent technique, is used, the method 200 can continue back to step 252 when stopping conditions are met or after a predetermined number of iterations are carried out. For example, the stopping conditions can include instances where the gradient surrounding the blurring metric $g_{k,j,p}$ is flat (or at a local minimum, as determined through comparing the gradient to a threshold gradient stop value) or where a previous iteration resulted in a lower blurring metric (e.g., $g_{k,j,p-1}$) than the blurring metric $g_{k,j,p}$ of the current iteration p. When using the predetermined calibration hypotheses testing process, it can be determined that the method 200 should proceed back to step 252 when there are one or more predetermined hypothesized calibration matrix sets left to test using the receive antenna responses $X_{k,j}$.

When it is determined that the method 200 will continue back to step 252, then a next set of hypothesized calibration matrices $C_{1,p+1}, C_{2,p+1}$ to be used in the next iteration of steps 254 and 256 is obtained. For example, the blurring metric cost function $g(Y_{k,j,p}, C_{1,p}, C_{2,p})$ can be used with gradient descent techniques to obtain the next hypothesized calibration matrix set $\{C_{1,p+1}, C_{2,p+1}\}$. In one embodiment, the following function can be used to obtain the next hypothesized calibration matrix set $\{C_{1,p+1}, C_{2,p+1}\}$:

$$C_{1,p+1} = C_{1,p} - \gamma_1 \nabla_1 g(Y_{k,j,p}, C_{1,p}, C_{2,p}) \qquad \text{(Equation 4a)}$$

$$C_{2,p+1} = C_{2,p} - \gamma_2 \nabla_2 g(Y_{k,j,p}, C_{1,p}, C_{2,p}) \qquad \text{(Equation 4b)}$$

where $\gamma_1, \gamma_2$ are the step-sizes, $\nabla_1 g(Y_{k,j,p}, C_{1,p}, C_{2,p})$ is the gradient of the blurring metric with respect to $C_{1,p}$ and $\nabla_2 g$ ($Y_{k,j,p}$, $C_{1,p}$, $C_{2,p}$) is the gradient blurring metric with respect to $C_{2,p}$. Thus, the next hypothesized calibration matrix set $\{C_{1,p+1}, C_{2,p+1}\}$ is obtained for purposes of step 252.

In other embodiments, such as when using the predetermined calibration hypotheses testing process, the subsequent execution of step 252 can include obtaining the next calibration set of hypothesized calibration matrices $C_{1,p+1}$, $C_{2,p+1}$ by simply recalling the next set of calibration hypotheses to be tested from memory, such as from memory of vehicle radar system 10 or from memory of another VSM of vehicle 100 (e.g., a memory device of onboard computer 130). Thus, the steps 252 through 256 are carried out P times until a blurring metric $g_{k,j,p}$ is obtained for each combination of: hypothesized calibration matrices $C_{1,p}$, $C_{2,p}$ and each of the receive antenna responses $X_{k,j}$ (e.g., assuming that K=1 for each receive radar frame j, then a total of J×P iterations are carried out for steps 252 through 256). Once all of the blurring metrics $g_{1,1,1}$ to $g_{K,J,P}$ are obtained, then the method can continue to step 258.

In step 258, the hypothesized calibration matrices $C_{1,p}$, $C_{2,p}$ are selected. In one embodiment, this can include selecting the hypothesized calibration matrix set $\{C_{1,p}, C_{2,p}\}$ that is associated with the lowest overall blurring metric $g_p$. In another embodiment, the hypothesized calibration matrix set $\{C_{1,p}, C_{2,p}\}$ that is associated with the lowest individual blurring metric $g_{k,j,p}$ is selected. In either case, the method generally attempts to select the hypothesized calibration matrix set $\{C_{1,p}, C_{2,p}\}$ that results in the sharpest or best quality image (i.e., the image with the least amount of blurriness or the greatest sharpness). The selected calibration matrix set $\{C_{1,p}, C_{2,p}\}$ and/or the blurring metrics (e.g., $g_p$, $g_{k,j,p}$) can be stored in memory, such as in memory of vehicle radar system 10 or in memory of another VSM of vehicle 100 (e.g., a memory device of onboard computer 130). The method 200 then continues to step 260.

In step 260, the selected calibration matrices $C_{1,p}$, $C_{2,p}$ can be stored or used to update the initial calibration matrices $C_1$ and $C_2$. In one embodiment, the selected calibration matrices $C_{1,p}$, $C_{2,p}$ can simply replace the initial calibration matrices $C_1$ and $C_2$ (thus, the selected calibration matrices $C_{1,p}$, $C_{2,p}$ are the new calibration matrices $\hat{C}_1$ and $\hat{C}_2$). In another embodiment, the selected calibration matrices $C_{1,p}$, $C_{2,p}$ can be weighted (e.g., multiplied by a weighting factor) based on how many receive antenna responses $X_{k,j}$ are obtained, based on the number of receive radar frames, and/or based on how many times the method 200 was used to previously update the calibration matrices. Additionally, in some embodiments, the selected calibration matrices $C_{1,p}$, $C_{2,p}$ and/or the initial calibration matrices $C_1$ and $C_2$ can be associated with a confidence score and, thus the initial calibration matrices $C_1$ and $C_2$ can be updated based on the confidence values associated with the respective sets of matrices. Using these weighting techniques, the selected calibration matrices $C_{1,p}$, $C_{2,p}$ are used with the initial calibration matrices $C_1$ and $C_2$ to obtain the new calibration matrices $\hat{C}_1$ and $\hat{C}_2$. The new calibration matrices $\hat{C}_1$ and $\hat{C}_2$ can then be stored in memory of vehicle radar system 10, or memory of another VSM of vehicle 100. The method 200 continues to step 270.

In step 270, the new calibration matrices $\hat{C}_1$ and $\hat{C}_2$ are then applied to receive antenna responses X to calibrate one or more of the receive antennas. In one embodiment, the vehicle radar system 10 can use the new calibration matrices $\hat{C}_1$ and $\hat{C}_2$ to obtain beamforming images corresponding to the receive antenna responses $X_{k,j}$ that were used in the calibration searching process. In other embodiments, the new calibration matrices $\hat{C}_1$ and $\hat{C}_2$ are then applied to future (or other) receive antenna responses X to obtain new beamforming images $\hat{Y}$. In any event, the new beamforming images $\hat{Y}$ can then be used to obtain a target object parameter, such as elevation or azimuth of the target object, as well as other information.

In step 280, target parameters concerning a target object can be calculated using the beamforming image $\hat{Y}$. Various Doppler frequency shift equations, as well as various other information, can be used to determine the elevation or azimuth of the target object through use of the beamforming image $\hat{Y}$. For example, angle of arrival information, velocity of the target object, range, and/or other spatial information can be determined through processing received signals at the radar system 10 using the new calibration matrices $\hat{C}_1$ and $\hat{C}_2$ and/or the beamforming image $\hat{Y}$. In one embodiment, MIMO angular resolution techniques can be used to determine the angle between the radar system 10 and the target object 18.

After the elevation or azimuth (or other information) of the target object is calculated, the elevation or azimuth (or other information) can be sent to other vehicle system modules (VSMs), such as ECU 120, onboard computer 130, and/or other VSMs 140. Additionally, velocity and range information can be sent along with the azimuth and elevation of the target object to other VSMs. This information can be used for various vehicle operations, such as providing notifications to a vehicle operator or passenger and/or carrying out various semi-autonomous or fully-autonomous vehicle functionality. The method 200 may end at this point or loop back for continued execution.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of calibrating a vehicle radar system, the vehicle radar system comprises a transmit antenna array having a plurality of transmitting antennas and a receive antenna array having a plurality of receiving antennas, the method comprises the steps of:

transmitting a plurality of transmit signals with the transmit antenna array;

receiving a plurality of receive signals with the receive antenna array;

obtaining a plurality of receive antenna responses based on the plurality of receive signals, each of the plurality of receive antenna responses includes position information relating to a target object;

applying a plurality of hypothesized calibration matrices to each of the plurality of receive antenna responses to obtain a plurality of calibrated array responses, each of the plurality of hypothesized calibration matrices includes calibration information relating to the vehicle radar system;

applying at least one beamformer matrix to each of the plurality of calibrated array responses to obtain a plurality of beamforming images;

deriving at least one blurring metric for each of the plurality of beamforming images, each of the plurality of blurring metrics is representative of a beamforming image resolution;

selecting at least one of the plurality of hypothesized calibration matrices based on the plurality of blurring metrics, the selected hypothesized calibration matrix is associated with the blurring metric having the best beamforming image resolution; and using the selected hypothesized calibration matrix to calibrate the vehicle radar system, wherein the using step further comprises obtaining a first new calibration matrix $\hat{C}_1$ and a second new calibration matrix $\hat{C}_2$ based on the selected hypothesized calibration matrix, calculating a new beamforming image $\hat{Y}$ using the first new calibration matrix $\hat{C}_1$ and the second new calibration matrix $\hat{C}_2$, and determining one or more target parameter(s) for a target object by evaluating the new beamforming image $\hat{Y}$, and the using step is carried out by the vehicle radar system.

2. The method of claim 1, further comprising the steps of:
generating a modulated signal $MS_1$ with a transmitter;
mixing the modulated signal $MS_1$ with a code sequence $C_1$ to $C_N$ to produce a plurality of transmit signals $Tx_1$ to $TX_N$, the code sequence $C_1$ to $C_N$ includes at least one separate code for each of the plurality of transmitting antennas in the transmit antenna array, the mixing step is performed before the transmitting step; and de-mixing a plurality of receive signals $Rx_1$ to $Rx_M$ with the code sequence $C_1$ to $C_N$ to produce a plurality of separated receive signals $S_{1,1}$ to $S_{M,N}$, the separated receive signals $S_{1,1}$ to $S_{M,N}$ include at least N number of separated signals for each of the plurality of receiving antennas in the receive antenna array, the de-mixing step is performed after the receiving step;

wherein the obtaining step further comprises obtaining a plurality of receive antenna responses $X_{1,1}$ to $X_{K,J}$ based on the plurality of separated receive signals $S_{1,1}$ to $S_{M,N}$, which in turn are based on the plurality of receive signals $Rx_1$ to $Rx_M$.

3. The method of claim 1, wherein the obtaining step further comprises performing a pre-beamforming process that includes separating a plurality of receive signals $Rx_1$ to $Rx_M$ into a plurality of separated receive signals $S_{1,1}$ to $S_{M,N}$, and the separating step is performed by a receiver that is part of the vehicle radar system.

4. The method of claim 3, wherein the obtaining step further comprises performing a pre-beamforming process that includes filtering the plurality of separated receive signals $S_{1,1}$ to $S_{M,N}$ based on a Doppler frequency shift f and/or a range r and associating the filtered signals with one or more Doppler-range bins.

5. The method of claim 4, wherein the obtaining step further comprises performing a pre-beamforming process that includes determining if one or more Doppler-range bin(s) adequately indicate the presence of a target object and, if so, using the Doppler-range bin(s) to obtain a plurality of receive antenna responses $X_{1,1}$ to $X_{K,J}$.

6. The method of claim 1, wherein each of a plurality of receive antenna responses $X_{1,1}$ to $X_{K,J}$ is maintained by the vehicle radar system as a multi-dimensional data structure that has N×M number of elements with azimuth and elevation information, where N represents the plurality of transmitting antennas, M represents the plurality of receiving antennas, k represents a Doppler-range bin, and j represents a receive radar frame.

7. A method of calibrating a vehicle radar system, the vehicle radar system comprises a transmit antenna array having a plurality of transmitting antennas and a receive antenna array having a plurality of receiving antennas, the method comprises the steps of:

transmitting a plurality of transmit signals with the transmit antenna array;

receiving a plurality of receive signals with the receive antenna array;

obtaining a plurality of receive antenna responses based on the plurality of receive signals, each of the plurality of receive antenna responses includes position information relating to a target object;

applying a plurality of hypothesized calibration matrices to each of the plurality of receive antenna responses to obtain a plurality of calibrated array responses, each of the plurality of hypothesized calibration matrices includes calibration information relating to the vehicle radar system;

applying at least one beamformer matrix to each of the plurality of calibrated array responses to obtain a plurality of beamforming images;

deriving at least one blurring metric for each of the plurality of beamforming images, each of the plurality of blurring metrics is representative of a beamforming image resolution;

selecting at least one of the plurality of hypothesized calibration matrices based on the plurality of blurring metrics, the selected hypothesized calibration matrix is associated with the blurring metric having the best beamforming image resolution; and using the selected hypothesized calibration matrix to calibrate the vehicle radar system, wherein the first applying step further comprises retrieving an initial set of hypothesized calibration matrices $C_{1,1}$ and $C_{2,1}$ from electronic memory in the vehicle radar system, using the initial set of hypothesized calibration matrices $C_{1,1}$ and $C_{2,1}$ to generate one or more subsequent set(s) of hypothesized calibration matrices $C_{1,p}$ and $C_{2,p}$, and using the subsequent set(s) of hypothesized calibration matrices $C_{1,p}$ and $C_{2,p}$ to generate a plurality of hypothesized calibration matrices $C_{1,1}$ to $C_{1,p}$ and $C_{2,1}$ to $C_{2,p}$ which are applied to a plurality of receive antenna responses $X_{1,1}$ to $X_{K,J}$.

8. The method of claim 7, wherein the using step further comprises using a gradient descent technique in conjunction with one or more of the plurality of hypothesized calibration matrices $C_{1,1}$ to $C_{1,p}$ and $C_{2,1}$ to $C_{2,p}$ to obtain one or more new hypothesized calibration matrix(ces) $C_{1,p+1}, C_{2,p+1}$ for use in a next iteration (p+1).

9. The method of claim 8, wherein the one or more new hypothesized calibration matrix(ces) $C_{1,p+1}$, $C_{2,p+1}$ for use in a next iteration (p+1) are obtained using the following equations:

$$C_{1,p+1}=C_{1,p}-\gamma_1\nabla_1 g(Y_{k,j,p},C_{1,p},C_{2,p}); \text{ and}$$

$$C_{2,p+1}=C_{2,p}-\gamma_2\nabla_2 g(Y_{k,j,p},C_{1,p},C_{2,p})$$

where $\gamma_1$, $\gamma_2$ represent step-sizes, $\nabla_1 g(Y_{k,j,p},C_{1,p},C_{2,p})$ represents a gradient of a blurring metric with respect to $C_{1,p}$ and $\nabla_2 g(Y_{k,j,p},C_{1,p},C_{2,p})$ represents a gradient of a blurring metric with respect to $C_{2,p}$.

10. The method of claim 1, wherein the first applying step further comprises applying each of a plurality of receive antenna responses $X_{1,1}$ to $X_{K,J}$ to each of a plurality of hypothesized calibration matrices $C_{1,1}$ to $C_{1,p}$ and $C_{2,1}$ to $C_{2,p}$ to obtain a plurality of calibrated array responses $Z_{1,1,1}$ to $Z_{k,j,p}$, and the first applying step is carried out by the vehicle radar system according to the following equation:

$$Z_{k,j,p}=C_{1,p}X_{k,j}C_{2,p},$$

where the hypothesized calibration matrices $C_{1,1}$ to $C_{1,p}$ include elevation calibration information, the hypothesized calibration matrices $C_{2,1}$ to $C_{2,p}$ include azimuth calibration information, k represents a Doppler-range bin, j represents a receive radar frame, and p represents a calibration iteration.

11. The method of claim 1, wherein the second applying step further comprises applying a first beamformer matrix $F_1$ and a second beamformer matrix $F_2$ to each of a plurality of calibrated array responses $Z_{1,1,1}$ to $Z_{K,J,P}$ to obtain a plurality of beamforming images $Y_{1,1,1}$ to $Y_{K,J,p}$, and the second applying step is carried out by the vehicle radar system according to the following equation:

$$Y_{k,j,p}=F_1 Z_{k,j,p} F_2$$

where the first beamformer matrix $F_1$ includes elevation information related to a target object, the second beamformer matrix $F_2$ includes azimuth information related to the target object, k represents a Doppler-range bin, j represents a receive radar frame, and p represents a calibration iteration.

12. The method of claim 11, wherein the first beamformer matrix $F_1$ and the second beamformer matrix $F_2$ are Bartlett beamformers.

13. The method of claim 1, wherein the deriving step further comprises using an edge detection technique in conjunction with a blurring metric cost function $g(Y_{k,j,p}, C_{1,p}, C_{2,p})$ to derive a plurality of blurring metrics $g_{k,j,p}$ for a plurality of beamforming images $Y_{1,1,1}$ to $Y_{K,J,P}$, and the deriving step is carried out by the vehicle radar system.

14. The method of claim 1, wherein the vehicle radar system continues to derive a plurality of blurring metrics until at least one stopping condition is met, the at least one stopping condition is selected from a plurality of stopping conditions that includes: a condition when a gradient associated with a blurring metric is flat, a condition when a gradient associated with a blurring metric is at a local minimum, or a condition when a previous iteration resulted in a blurring metric with a better beamforming image resolution.

15. The method of claim 1, wherein the deriving step further comprises calculating an overall blurring metric $g_p$ for a given set of hypothesized calibration matrices $C_{1,p}$, $C_{2,p}$, the overall blurring metric $g_p$ is representative of an overall score for the given set of hypothesized calibration matrices $C_{1,p}$, $C_{2,p}$ in terms of the beamforming image resolution, and the deriving step is carried out by the vehicle radar system.

16. The method of claim 15, wherein the deriving step further comprises calculating the overall blurring metric $g_p$ according to the following equation:

$$g_p = \sum_{j=1}^{J}\sum_{k=1}^{Kj} g_{k,j,p}$$

where k represents a Doppler-range bin, j represents a receive radar frame, and p represents a calibration iteration.

17. The method of claim 15, wherein the selecting step further comprises selecting the given set of hypothesized calibration matrices $C_{1,p}$, $C_{2,p}$ that is associated with the overall blurring metric $g_p$ having the best beamforming image resolution.

18. A vehicle radar system, the vehicle radar system is mounted on a host vehicle and comprises:
a transmitter;
a transmit antenna array with a plurality of transmitting antennas coupled to the transmitter, the transmit antenna array transmits a plurality of transmit signals;
a receive antenna array with a plurality of receiving antennas, the receive antenna array receives a plurality of receive signals; and
a receiver coupled to the receive antenna array, wherein the receiver is configured to:
obtain a plurality of receive antenna responses based on the plurality of receive signals, each of the plurality of receive antenna responses includes position information relating to a target object;
apply a plurality of hypothesized calibration matrices to each of the plurality of receive antenna responses to obtain a plurality of calibrated array responses, each of the plurality of hypothesized calibration matrices includes calibration information relating to the vehicle radar system;
apply at least one beamformer matrix to each of the plurality of calibrated array responses to obtain a plurality of beamforming images;
derive at least one blurring metric for each of the plurality of beamforming images, each of the plurality of blurring metrics is representative of a beamforming image resolution;
select at least one of the plurality of hypothesized calibration matrices based on the plurality of blurring metrics, the selected hypothesized calibration matrix is associated with the blurring metric having the best beamforming image resolution; and
use the selected hypothesized calibration matrix to calibrate the vehicle radar system, wherein the using operation includes obtaining a first new calibration matrix $\hat{C}_1$ and a second new calibration matrix $\hat{C}_2$ based on the selected hypothesized calibration matrix, calculating a new beamforming image $\hat{Y}$ using the first new calibration matrix $\hat{C}_1$ and the second new calibration matrix $\hat{C}_2$, and determining one or more target parameter(s) for a target object by evaluating the new beamforming image $\hat{Y}$, and the using step is carried out by the vehicle radar system.

* * * * *